Dec. 1, 1970  O. OECKL ETAL  3,544,286
TOOL CHANGER FOR MACHINE TOOLS
Filed April 8, 1968  3 Sheets-Sheet 1

INVENTORS
Otto Oeckl
Richard Purschke
BY Stephens, Huettig and O'Connell
ATTORNEYS Dec. 1, 1970          O. OECKL ETAL          3,544,286

TOOL CHANGER FOR MACHINE TOOLS

Filed April 8, 1968          3 Sheets-Sheet 2

INVENTORS
Otto Oeckl
Richard Purschke

BY Stephens, Huettig and O'Connell
ATTORNEYS

United States Patent Office 3,544,286
Patented Dec. 1, 1970

3,544,286
TOOL CHANGER FOR MACHINE TOOLS
Otto Oeckl, Munich, and Richard Purschke, Hoppach, Germany, assignors to Maschinenfabrik Augsburg-Nurnberg Aktiengesellschaft, Munich, Germany
Filed Apr. 8, 1968, Ser. No. 719,598
Claims priority, application Germany, Apr. 7, 1967, M 73,501; Nov. 14, 1967, M 76,213
Int. Cl. B23q 3/157
U.S. Cl. 29—568                    7 Claims

ABSTRACT OF THE DISCLOSURE

The headstock of a machine tool carries two spindles alternately turnable from a tool working to a tool change position. Tools are stored on the periphery of a circular tool magazine. Each tool is mechanically removed from a spindle in the tool change position and put into the magazine, and vice versa.

---

This invention relates to an apparatus for changing the tools for a machine tool. In particular, this invention is directed to a machine tool having two spindles whose longitudinal axes are at an angle to each other and which are mounted so that they can be turned or swung alternately from a working position to a tool change position.

Heretofore, machine tools having two or more spindles have the longitudinal axes of the spindles lying in one plane and intersecting. The spindles are not axially displaceable. The tool storage magazine is positioned near the machine and is generally in the form of a drum rotatable about its vertical axis. The tools are removed from the magazine by movable tongs and are inserted into the spindle which is in the tool change position, and vice versa.

The operation of such tool changing system is very unsatisfactory because the movement of the tool toward the spindle being changed, which spindle is not axially movable, by means of the tongs requires movement in several coordinates which necessitates a suitable control element for each coordinate. Also, considerable space is required for tool changing and the time allowed for changing tools under certain circumstances is not sufficient.

The object of this invention is to produce an apparatus avoiding the heretofore disadvantages and making possible a quick tool change in a spindle.

In this invention, the two spindles are offset from one another and each spindle is movable along its longitudinal axis so that, when in tool change position, it can be brought adjacent the tool storage magazine so that the tool can be changed by use of a quick action chuck on the spindle. In contrast to heretofore used systems, the longitudinal axes of the spindles lie in different parallel planes and the spindle which is in tool change position can be moved along its longitudinal axis.

Thus, in this invention, it is possible to move the spindle to the tool change position adjacent the tool storage magazine and there remove the old tool and insert a new tool. Instead of using the heretofore complicated grasping and swinging of a tong, this invention uses merely an axial movement of the spindle. Since the spindle to have a tool change is moved from one position to another across the other spindle, the apparatus can be of small size and the tool magazine can be located close to the spindle. It is also possible to provide for large spindle path displacement. The spindle movement herein referred to for changing the tools does not mean the working advance movement of the spindles when in use.

Another advantage of this invention is the great distance between the bearings of the spindles, which increases the accuracy of the machine operation.

A further feature of the invention is that the spindles are longitudinally moved by a hydraulic or pneumatic actuated piston cylinder element. This has the advantage that the fluid used for pressure, as oil or air, is usually already present in the machine tool. If this is of no advantage, it is possible to effect the longitudinal movement of the spindles mechanically, as with gear racks or other known drives.

Another feature of this invention is that for stopping the longitudinal movement of the spindles they are pressed by the piston cylinder element against a clutch which thus forms a stop between the spindles and the machine tool drive shaft. This is of special advantage as no additional stops or mechanisms are needed for the stopping of the longitudinal movement of the working spindle.

A further characteristic of the invention is that the headstock, which forms the swivel base of the spindles, and the tool magazine are mounted on a disc rotatable around an axis lying in a horizontal plane. This has the advantage that the disc can be turned any degree from the vertical up to and including the horizontal.

A further feature of the invention is that the tool magazine can be reached in every work position by the spindle in tool change position by moving that spindle longitudinally.

In order to make a rapid tool change, a piston rod is located adjacent the disc magazine with the tools held on the periphery of the disc. This rod has a gripper which takes a tool from the magazine and moves it with one motion to the tool change spindle where it is placed in the spindle chuck.

This has the advantage that the rod has a short stroke and thus needs less time for a tool change. Also, the piston rod is always in a ready position for a particular tool which is brought into position by rotating the disc magazine so that the tool is in front of the piston rod.

The piston rod of this invention has a pneumatically, hydraulically or mechanically operated gripper or claws whose holding force is greater than the clasps which hold the tools on the magazine.

The form of the gripper makes it possible that the tools can be changed without any additional control mechanisms.

The tools of this invention are composed of two different sized portions longitudinally aligned and in which the portion with the smaller diameter is engageable by a clasp on the magazine while the larger diameter portions are engaged by the gripper.

The greater holding power of the gripper exists on the larger diameter portion of the tool. This shape of the tool is also desirable for the exact fixing of a tool in the spindle chuck in the automatic operation of the machine.

The means by which the objects of this invention are obtained are described more fully with reference to the accompanying drawings in which.

Figure 1:
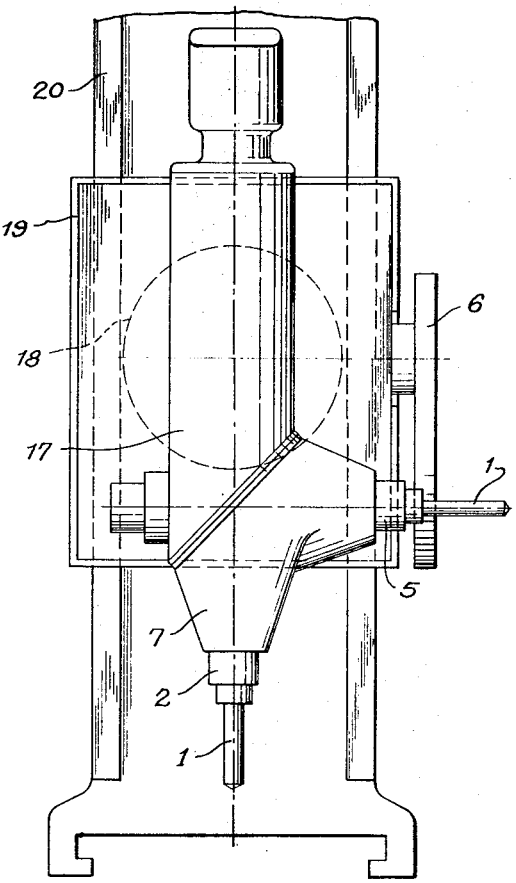
FIG. 1 is a front view of the apparatus of this invention.
Figure 2:
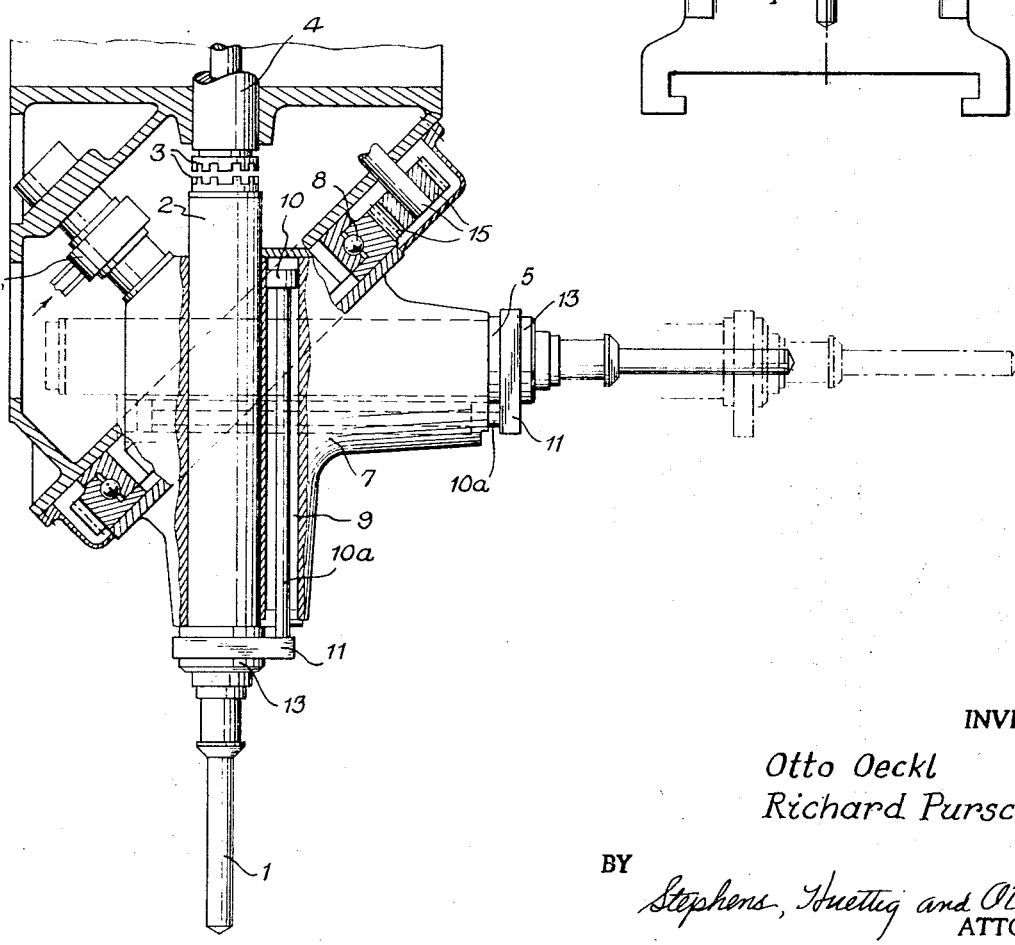
FIG. 2 is an enlarged cross-sectional view through a spindle.

A sled 19 is movably mounted on the machine stand 20 and carries the headstock 17 and the tool magazine 6.

The sled is rotatably mounted on a disc 18. Spindle 2 is shown in vertical working position while spindle 5 is horizontally directed and in the tool change position adjacent the tool magazine. Spindle 2 is shown ready to be joined to gear clutch 3 on the end of drive shaft 4. Both spindles 2 and 5 are held in the spindle head 7. Spindle head 7 is rotatable on the ring bearing 8 and is driven by gears 15 independently of the drive shaft 4 so that each spindle can be alternately placed in the working and tool change positions.

Spindles 2 and 5 are each mounted in the spindle head so that they can be moved along their longitudinal axes. Each spindle has a piston cylinder element composed of a cylinder 9 in the spindle head and a piston 10 in the cylinder joined to a piston rod 10a. Rod 10a extends outwardly of cylinder 9 and is joined to ring 11 attached to the spindle. When the spindle is in working position, it is stopped against longitudinal movement by clutch 3 against which it bears, movement being by the corresponding filling of cylinder 9. The spindle in tool change position is brought within range of tool magazine 6 by pressure fluid flowing through valve 16.

Figure 3:
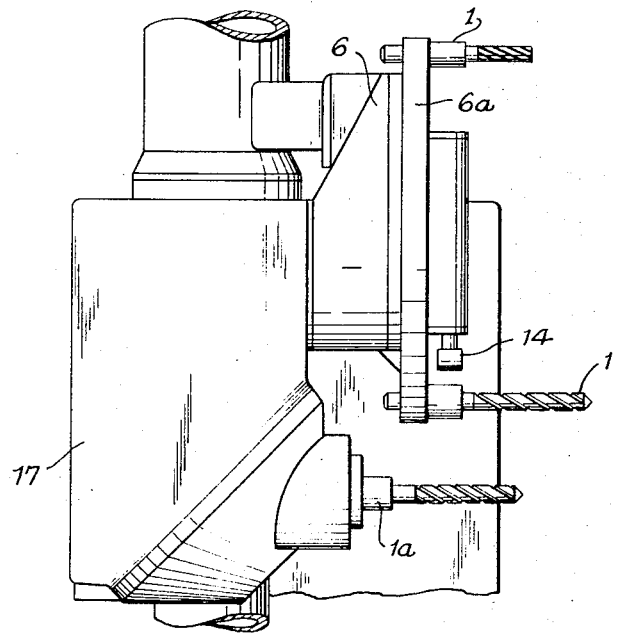
FIG. 3 is a front view of the tool magazine mounted on the machine.
Figure 4:
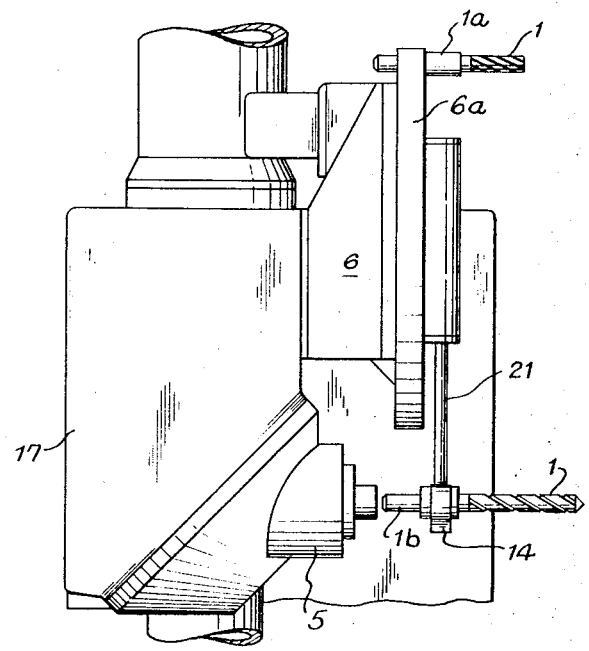
FIG. 4 is a similar view showing a tool in the process of being changed.
Figure 5:
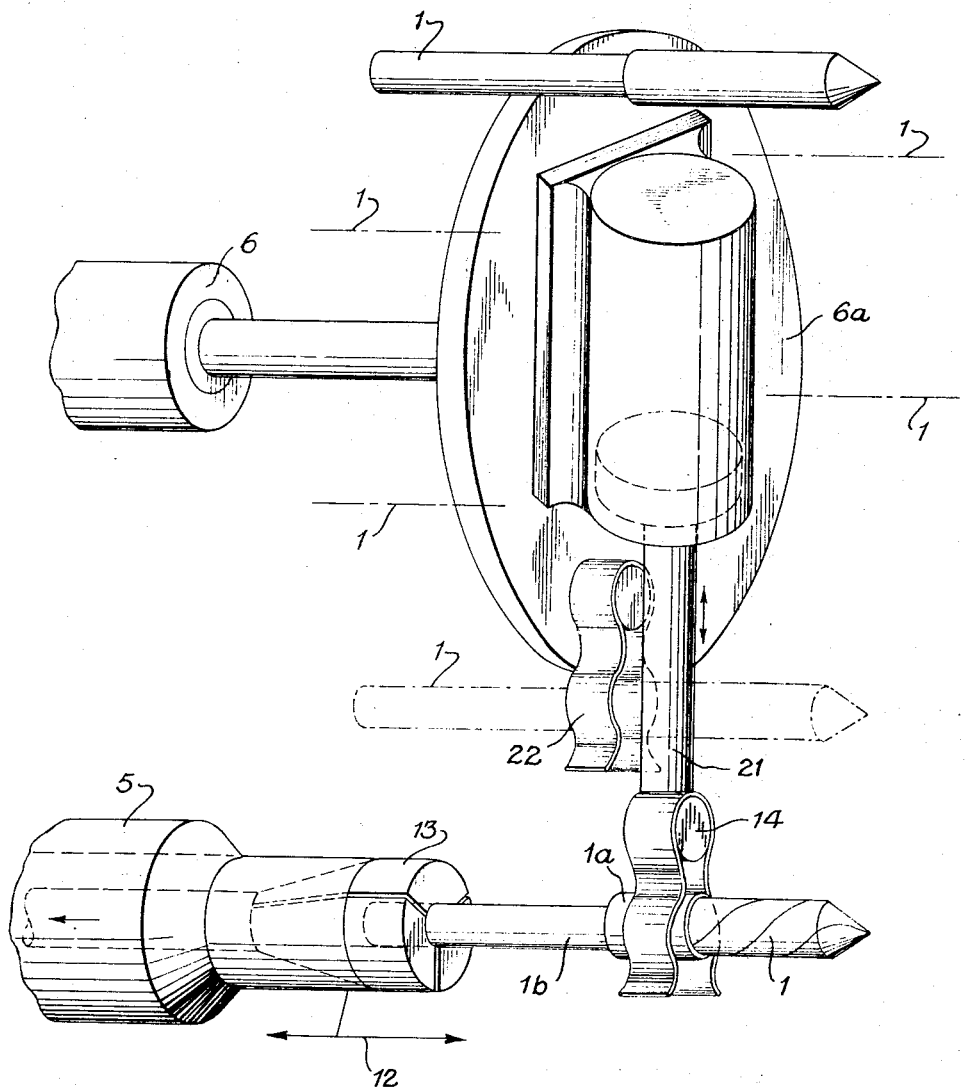
FIG. 5 is an enlarged perspective view schematically showing the transfer of a tool from the magazine to the spindle in tool change position.

As shown in FIGS. 3, 4 and 5, the tool magazine 6 includes a rotatable disc 6a and piston rod means 21 having a tool gripper 14. Disc 6a can be rotated relative to piston rod means 21. The tools are held on the circular periphery of disc 6a by clasps 22. The piston rod means 21 can be retracted a distance so that any chosen tool 1 can be aligned with tool gripper 14 by rotating disc 6a. To change a tool, the spindle 5 moves forward by being driven by the piston cylinder elements 9, 10 and 10a up to adjacent the magazine 6. Then the piston rod means moves down so that gripper 14 tightly engages tool 1. The quick action chuck 13 opens and the spindle retracted a length 12, FIG. 5, so that the tool is released from the chuck 13. The rod means 21 then retracts and brings the tool up into the clasp 22 on disc 6a. The disc is then rotated until a new tool 1 is placed below the tool gripper 14. Rod means 21 then moves out so that the gripper 14 engages the new tool and removes it from the disc 6a and centers it with spindle 5. The spindle then moves outwardly along the length 12 for the insertion of the new tool and then holds it with the quick action chuck 13. Rod means 21 is then retracted, the spindle also retracts to its original position, and instead of using fluid pressure, a pressure spring can be used in cylinder 9 for returning the spindle to the clutch 3. Spindle 5 is then ready with the new tool so that it can be swung into working position.

Each tool is composed of a large diameter portion 1a aligned with a smaller diameter portion 1b. Portion 1a is engageable by gripper 14 while portion 1b is engageable by clasp 22. Gripper 14 has a greater holding force than clasp 22 which is necessary for removing and returning the tool to the clasp 22.

Having now described the means by which the objects of the invention are obtained, we claim:

1. A quick tool changing machine tool comprising a drive shaft means whose axis is the working axis of the machine, at least two tool spindles each provided with a quick acting chuck, a rotatable turret element lying at an angle to the working axis of the machine tool, the axis of said turret lying in a plane parallel to said working axis, each said tool spindle being mounted in said turret with its axis at a distance from the axis of said turret equal to the distance between said plane of said turret axis and said working axis of said machine tool and each said spindle lying at an angle to the said turret such that in one position of said turret the axis of the spindle is aligned with the said drive shaft means, a tool magazine to hold a plurality of tools in parallelism to one said spindle when one other said spindle is in axial alignment with said drive shaft means, and means to select one tool from said magazine and to move said selected tool to a position axially of said one said spindle.

2. An apparatus as in claim 1, further comprising fluid pressure actuated means for longitudinally moving each spindle.

3. An apparatus as in claim 2, further comprising clutch means for coupling said drive shaft means to a spindle and forming a stop for one longitudinal movement of the spindle.

4. An apparatus as in claim 1 in which said magazine is a rotatable disc mounted on said machine and being rotatable on an axis parallel to the tools in said magazine to bring a tool into tool change position.

5. An apparatus as in claim 4, further comprising piston rod means adjacent said magazine for removing a tool from said magazine and bringing it into tool change position for insertion into said quick action chuck means.

6. An apparatus as in claim 5, further comprising clasps on said magazine for holding tools, and a gripper on said piston rod means for removing a tool from a clasp, said gripper having a stronger holding power than a clasp.

7. An apparatus as in claim 6, further comprising tools each of which has a small sized portion engageable by a clasp and a large sized portion engageable by said gripper.

References Cited

UNITED STATES PATENTS

| | | | |
|---|---|---|---|
| 3,023,677 | 3/1962 | Charlat | 29—568 |
| 3,025,978 | 3/1962 | Hill | 214—1BS4 |
| 3,225,439 | 12/1965 | Perry et al. | 29—568 |
| 3,298,098 | 1/1967 | Gleisner | 29—568 |

ANDREW R. JUHASZ, Primary Examiner

Z. R. BILINSKY, Assistant Examiner

U.S. Cl. X.R.

77—25